J. S. CROWELL.
ANIMAL-TRAP.

No. 188,343.                        Patented March 13, 1877.

WITNESSES:                          INVENTOR:

UNITED STATES PATENT OFFICE.

JOHN STEPHEN CROWELL, OF LOUISVILLE, KENTUCKY.

IMPROVEMENT IN ANIMAL-TRAPS.

Specification forming part of Letters Patent No. 188,343, dated March 13, 1877; application filed February 7, 1877.

*To all whom it may concern:*

Be it known that I, JOHN S. CROWELL, of Louisville, in the county of Jefferson and State of Kentucky, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in traps for catching animals of various kinds; and it consists in the peculiar arrangement and combination of parts that will be more fully described hereinafter, whereby the trap can be set directly over the hole of the animal, and thus be made to catch him around the neck and choke him to death.

Figure 1:
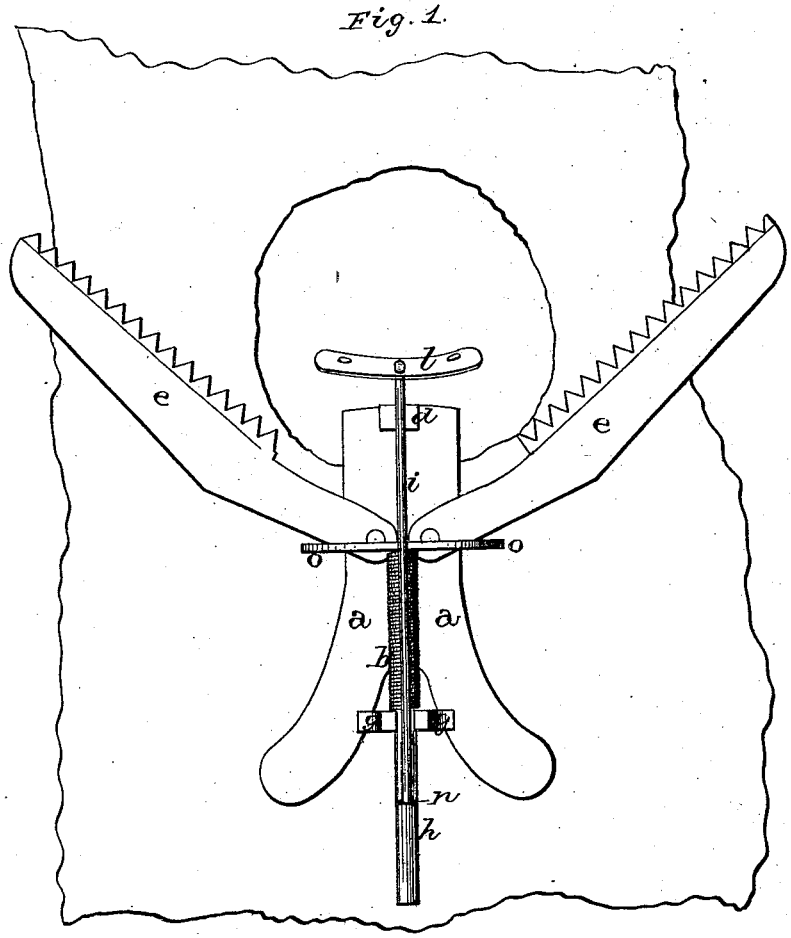
Figure 2:
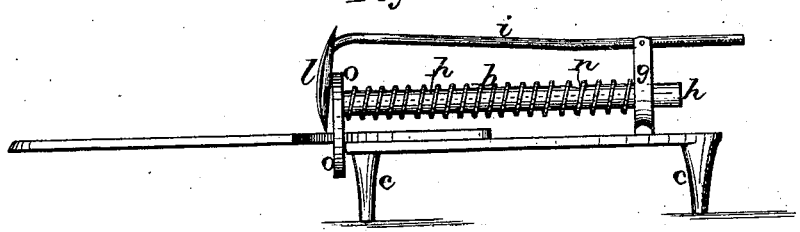

Figure 1 is a plan view of my invention. Fig. 2 is a side elevation of the same.

a represents a cast-iron frame, provided with three legs, c, that raise it a sufficient distance above the ground or floor, and which has a flat projection, d, formed on its front end, to act as a check to the movement of the jaws e. On the rear end of the frame is formed the guide g, through which passes the rod h, and to its top is pivoted the trigger i, the rear end of which trigger catches in the notch n, formed in the top of the rod h. To the front end of this trigger is fastened the plate l, which has two or more holes made through it to fasten the bait to, just beyond the front end of the frame. The two jaws e are pivoted to the top of the frame, at a suitable distance from its front end, and are armed, for the greater portion of their length, with sharp teeth, which interlock with each other. Secured to the front end of the rod h is a slide, o, which catches over the tops and edges of the two jaws e and serves to close them together with a snap when the front end of the trigger is drawn downward, so as to release the rod h, and the coiled spring b forces the slide and rod forward.

In setting the trap the trigger is first baited, and the slide pressed back until the rear end of the trigger catches in the notch in the top of the rod h. The slide being pressed backward, as shown in Fig. 1, the two jaws are left free to open outward, when the trap is ready to be placed in any suitable relation to the hole of the animal to be caught. Should the hole come up through the floor or ground, the trap should be placed over its top, as shown, so that the animal will have the bait before him as he comes out. Should the hole be in the side of the wall, the trap may be suspended from above by means of a string.

Having thus described my invention, I claim—

The frame a, provided with the guide g, in combination with the trigger i, rod h, spring, slide o, and jaws e, substantially as specified.

In testimony that I claim the foregoing I have hereunto set my hand this 25th day of January, 1877.

J. S. CROWELL.

Witnesses:
SAML. J. LOOK,
JOHN KELSALL.